United States Patent [19]

Al-Hamlan

[11] Patent Number: 5,174,499

[45] Date of Patent: Dec. 29, 1992

[54] IRRIGATION SYSTEM

[76] Inventor: Saleh A. Al-Hamlan, P.O. Box 12872, St. Ibrahim Islam, Jeddah, Saudi Arabia, 21483

[21] Appl. No.: 788,282

[22] Filed: Nov. 5, 1991

[51] Int. Cl.⁵ .............................................. B05B 12/08
[52] U.S. Cl. ..................................... 239/65; 137/78.3
[58] Field of Search ................ 137/78.2, 78.3; 405/37; 239/63, 65, 66

[56] References Cited

U.S. PATENT DOCUMENTS

| | | | |
|---|---|---|---|
| 2,362,747 | 11/1944 | Duke . | |
| 2,743,552 | 5/1956 | Hunter | 405/37 X |
| 3,797,253 | 3/1974 | Rodieck | 405/37 |
| 3,951,163 | 4/1976 | Rodieck | 137/122 |
| 4,014,361 | 3/1977 | Rodieck | 137/122 |
| 4,221,501 | 9/1980 | Saburi | 405/37 |
| 4,497,333 | 2/1985 | Rodieck | 137/122 |
| 4,739,789 | 4/1988 | Hamilton | 137/78.3 X |
| 4,763,837 | 8/1988 | Lijneh | 405/37 X |
| 4,948,294 | 8/1990 | Mercier | 405/37 |
| 5,117,855 | 6/1992 | Goldsmith | 137/78.3 |

FOREIGN PATENT DOCUMENTS

1146690  2/1961  Fed. Rep. of Germany ........ 239/65

Primary Examiner—Andres Kashnikow
Assistant Examiner—Kevin P. Weldon
Attorney, Agent, or Firm—Bacon & Thomas

[57] ABSTRACT

An irrigation system includes one or more valve assemblies which are connected in series to a pressurized source of water. Each valve assembly includes a cylindrical housing, a ball valve, an inlet and two outlets with one outlet generally opposite from the inlet in a lower portion of the housing. The other outlet is disposed in an upper portion of the housing and adapted to direct water to an area of ground for irrigation. A pit and float are associated with each valve assembly and arranged so that some of the irrigation water will flow into the pit and raise the float. The float is connected spring biasing element and a U-shaped pivotal member. This U-shaped pivotal member maintains a spring in a compressed or energy-stored condition and releases the spring biasing element when the float reaches a predetermined level so that the ball valve will spring upwardly to close the upper outlet and redirect the water to another assembly. Water pressure will then maintain the valve in that position.

7 Claims, 6 Drawing Sheets

FIG_1

IRRIGATION SYSTEM

BACKGROUND OF THE INVENTION

This invention relates to an improved irrigation system and, more particularly, to an improved apparatus for sequentially irrigating a plurality of areas or basins, automatically stopping the flow of water to an area when that area has received sufficient irrigation and redirecting the flow of water to another area.

Irrigation systems have been used for many years to provide plants and trees with water at various times during their growing cycle. For example, it has been common practice to provide plants and trees with water by means of irrigation ditches, hoses, sprayers, pipes and other types of apparatus. However, in certain situations, such as in orchards where the terrain is uneven, water will run from the high ground to the low. In such cases, the low lying trees may receive more water than those on higher ground.

In other cases, where the cost of water is relatively high it is desirable to control the amount of water provided for each area and to avoid wasting water by providing additional water to some plants in order to adequately water others or by leaving the water on for too long a period.

The above problems have been overcome to a degree by irrigation systems having a plurality of valves with each valve connected by means of pipes to a pressurized source of water. For example, the U.S. Pat. Nos. of Rodieck, 3,797,253 and 4,014,361, disclose systems wherein each item to be watered is provided with a well around its base and a separate valve within each of the wells. In such systems, one or more risers may be provided in order to force each valve that has been closed by the water reaching a preselected height in the well and to remain closed for as long as there is water pressure applied to the system. Such systems also include means to prevent the flow of water to a second valve until such time that a first area has been provided with a predetermined volume of water.

A more recent development is disclosed in my copending application entitled "Irrigation System," Ser. No. 07/457,870, which was filed on Dec. 27, 1989, and which is incorporated herein in its entirety by reference. As disclosed therein, an irrigation system includes one or more valve assemblies which are connected in series to a pressurized source of water. Each valve assembly includes a cylindrical housing, a ball valve, an inlet and two outlets with one outlet generally opposite from the inlet in a lower portion of the housing. The other outlet is disposed in an upper portion of the housing and is adapted to direct water to an area of ground for irrigation. A pit and a float are associated with each valve assembly and arranged so that some of the irrigation water will flow into the pit and raise the float. The float is connected to spring biasing means and when the float reaches a predetermined level, the ball valve will spring upwardly to close the upper outlet and redirect the water to another assembly. Water pressure will then maintain the valve in that position.

The present invention contemplates an improved system of the type which is disclosed in my aforementioned application. For example, in the aforementioned system, the pressure resulting from the flow of water creates friction between a ball and seat (outlet). Thus, as the water pressure is increased, the force which is required to move the ball upwardly out of contact with a first seat and into contact with the second seat increases. Consequently, it is necessary for the float to rise up to a higher level to activate the change. In other words, the prior art devices may be sensitive to changes in water pressure and increase or decrease the amount of water applied to an area in response to a change in water pressure.

It is presently believed that an improved irrigation system as disclosed and claimed herein provides for a more accurate determination of the amount of water to be delivered to a given area. Also, the amount of water delivered is independent of any changes in water pressure. In addition, the system disclosed herein is reliable in operation, minimizes the likelihood that a gate member will become stuck in a first position and thus fail to turn off a valve and will have a more rapid trigger action. It is also believed that the system disclosed herein may be readily and economically manufactured, relatively free of maintenance and simple to operate.

SUMMARY OF THE INVENTION

In essence, an irrigation system according to the present invention is designed for use with a pressurized source of water. The system includes a hollow valve housing having an upwardly extending hollow cylindrical portion with a first annular opening or outlet in an upper portion thereof. The housing also includes second and third annular openings which are preferably axially aligned and opposite from one another. The second annular opening or inlet is connected by a pipe to the pressurized source of water, while the third annular opening serves as an outlet and may be connected by suitable pipe means (a distribution pipe) to an inlet in a second valve housing. A valve seat or seat means is associated with each of said outlets and a ball-shaped gate member or ball valve is disposed within the housing and adapted to move upwardly and downwardly within the cylindrical portion of the housing between the outlets. The seat means are constructed and arranged for receiving the ball shaped gate member therein and thereagainst for mating therewith to close each of the outlets.

The irrigation system also includes means for defining a pit and/or basin which are disposed above the valve housing and float means are disposed within the pit or basin. The irrigation system includes an upwardly extending pipe which is connected to the first outlet and which extends upwardly above the basin. This upwardly extending pipe also includes an opening or spout means in an open portion thereof for directing the irrigation water outwardly and into the basin when the ball-shaped gate member is blocking the second outlet. Thus, when sufficient water has been applied to the area around the basin, excess water will run into the pit and raise the float. A rod is connected to the top of the ball-shaped gate member and extends upwardly through the upwardly extending pipe and has a spring, preferably a coil spring, fixed to an upper portion thereof. In the practice of the invention, the rod has a nut or stop means fixed to an upper portion thereof so that the coil spring may be slipped over the rod with one end of the spring resting against the nut or stop means. A displaceable biasing member engages a second and preferably the upper portion of the spring, so that any downward movement of the biasing member will compress the spring. Means for positioning and/or maintaining the biasing member and spring in a force stored position, preferably spring compressed position, and means for connecting the biasing member and float are also provided so that when the float is lifted by a change of the level of water in the pit, the spring biasing member is moved upwardly to thereby assert an upward force on the rod by means of the spring. And, when and upward force on the rod exceeds the force of the water holding the ball-shaped gate member in place, the ball will spring upwardly out of engagement with the seat which is associated with said second outlet and into engagement with the seat means which is associated with said first outlet to thereby close off the first outlet and direct the flow of water through the second outlet. Under such conditions the water pressure within the housing will hold the ball in a closed position with respect to the first outlet.

In other words, an irrigation system in accordance with the present invention includes means for storing a force, such as a compressed spring, which is sufficient to overcome a force against the ball-shaped gate member due to the flow of water. Therefore, when the float reaches a preselected height, the force in the spring is released to thereby direct the flow of water through the second outlet. In such systems, the opening of one outlet and closure of a second is solely dependent on the position of the float, i.e., the water level within a pit.

For comparison, the system according to my earlier invention did not incorporate means for storing a force in a spring, but instead used a float to compress a spring as a float moved upwardly with a rising level of water in a pit. In that system, the ball-shaped gate member remained in place until the force of the compressed spring exceeded the force against the gate member. Consequently, the release or opening of a gate was not solely dependent on the height of the float but also on the force attributed to the water pressure.

The invention will now be described in connection with the following drawings in which like numerals have been used to identify like parts.

DETAILED DESCRIPTION OF THE PREFERRED EMBODIMENT OF THE INVENTION

An irrigation system according to a preferred embodiment of the invention includes a plurality of valve assemblies as illustrated in FIGS. 1-4. Each of the valve assemblies 2 may be considered to be an irrigation system per se, but are normally connected together in series for irrigating a plurality of trees or plants sequentially as illustrated in FIG. 5.

The valve assembly 2 includes a hollow cylindrical housing 4 which is preferably disposed on a vertical axis, an annular opening or inlet 6, a first outlet 8 and a third annular opening or second outlet 10. Each of the annular openings 6, 8 and 10 are constructed and arranged to receive a pipe therein as, for example, by force fit, threaded, weld or etc. The housing 4 also defines a portion 12 which extends outwardly and tapers downwardly toward opening 6 to provide a longitudinally enlarged opening 13 on the inner side of housing 4. This enlarged opening 13 is reduced in cross section along a vertical axis as it extends outwardly until it coincides with the right circular cross section of opening 6.

Figure 1:
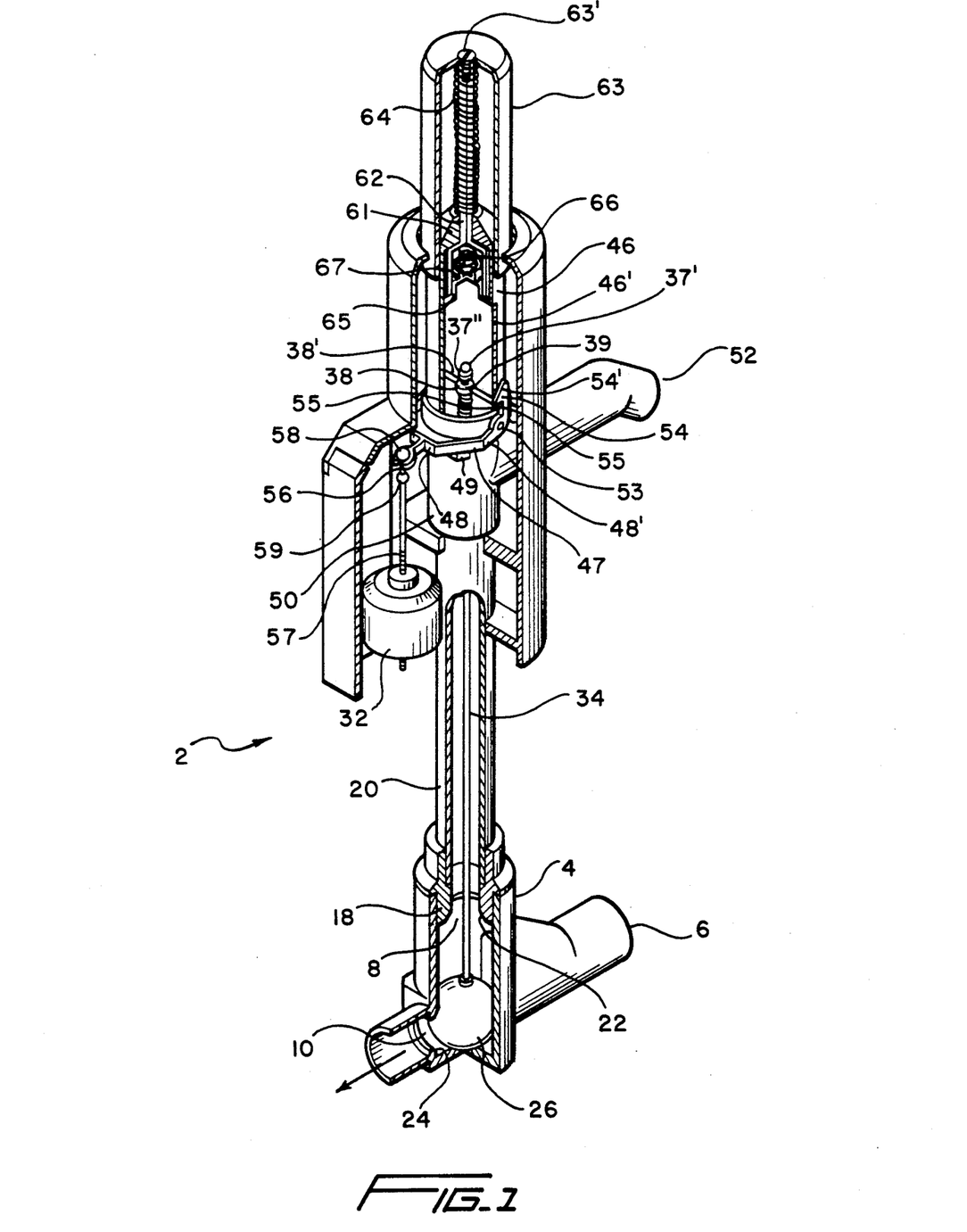
FIG. 1 is an isometric view which is partially broken away to illustrate the operable parts of an irrigation system according to a first embodiment of the invention.
Figure 2:
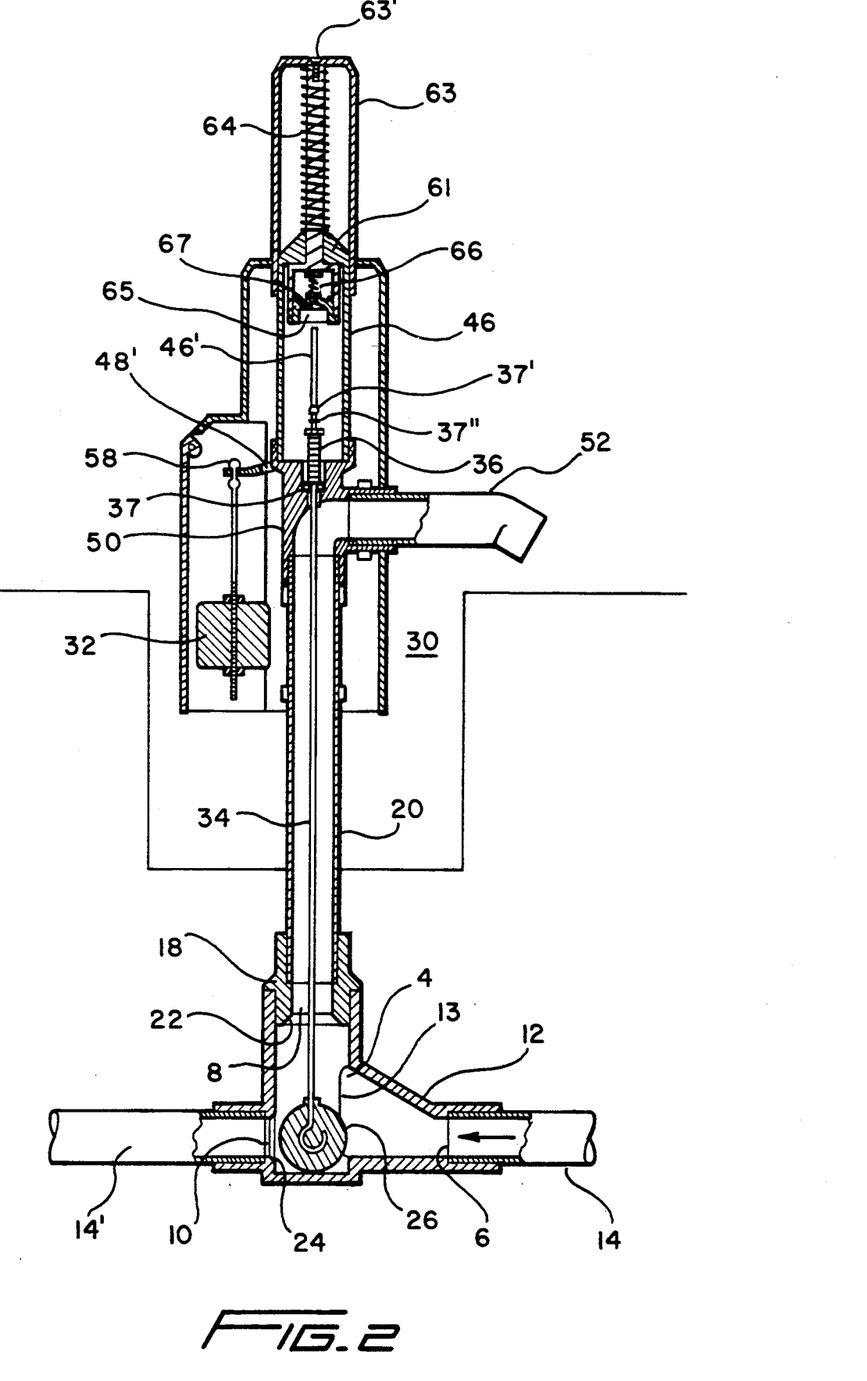
FIG. 2 is cross sectional view taken along the line 2—2— of FIG. 1.
Figures 3, 4:
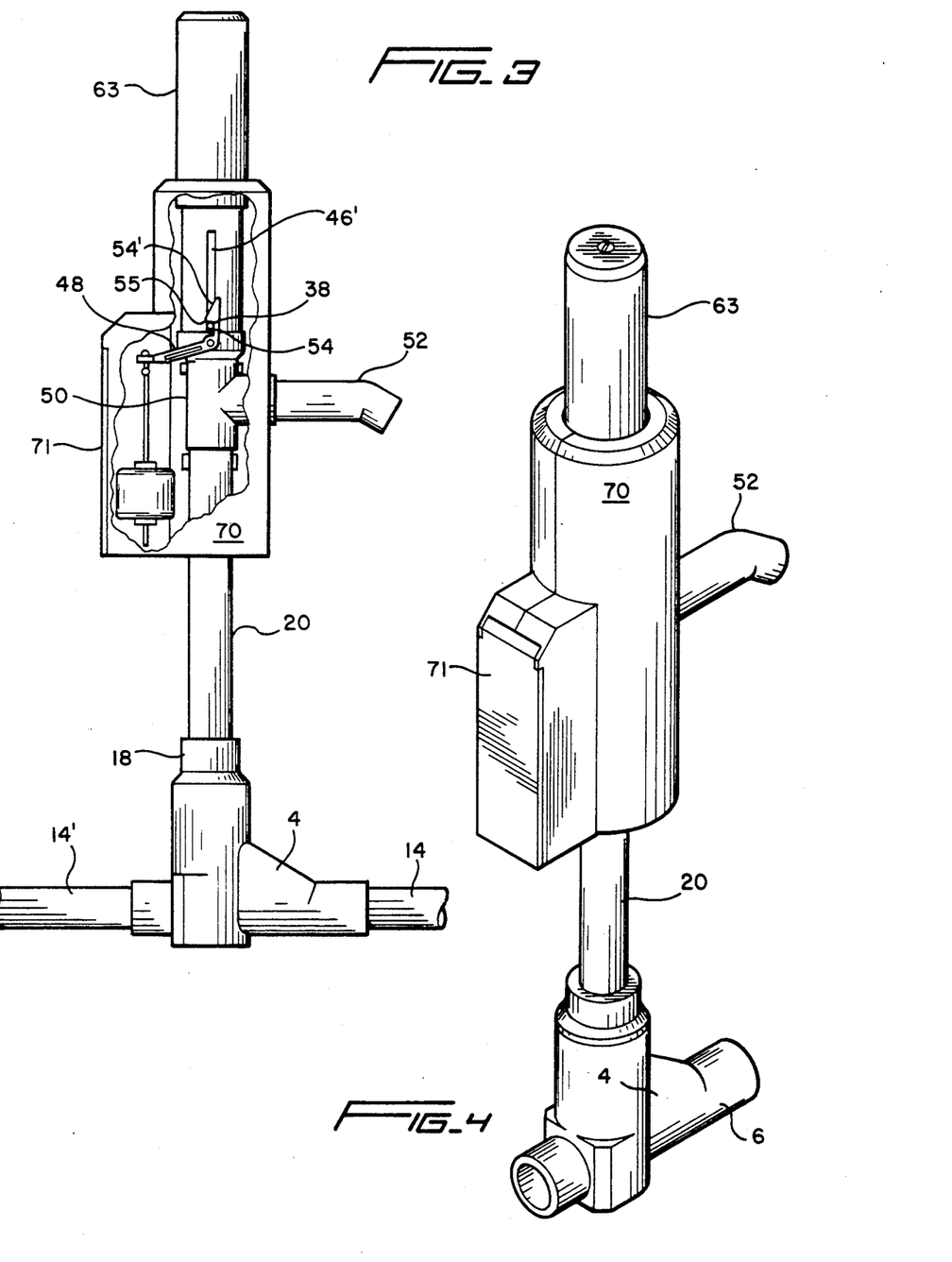
FIG. 3 is a side-elevational view which is partially-broken away to show an assembly in a force stored position.
FIG. 4 is an isometric view of the valve assembly shown in FIG. 1.
Figure 5:
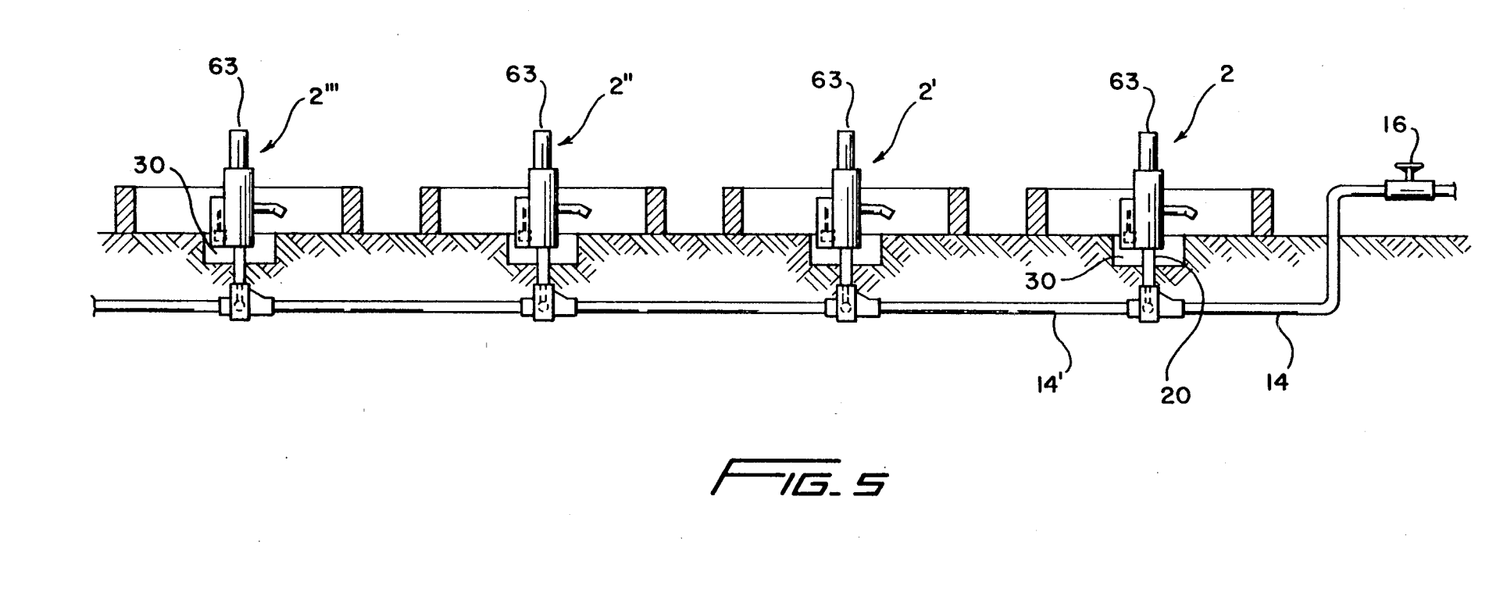
FIG. 5 is a schematic view which illustrates an irrigation system having a plurality of valve assemblies according to the present invention.
Figure 6:
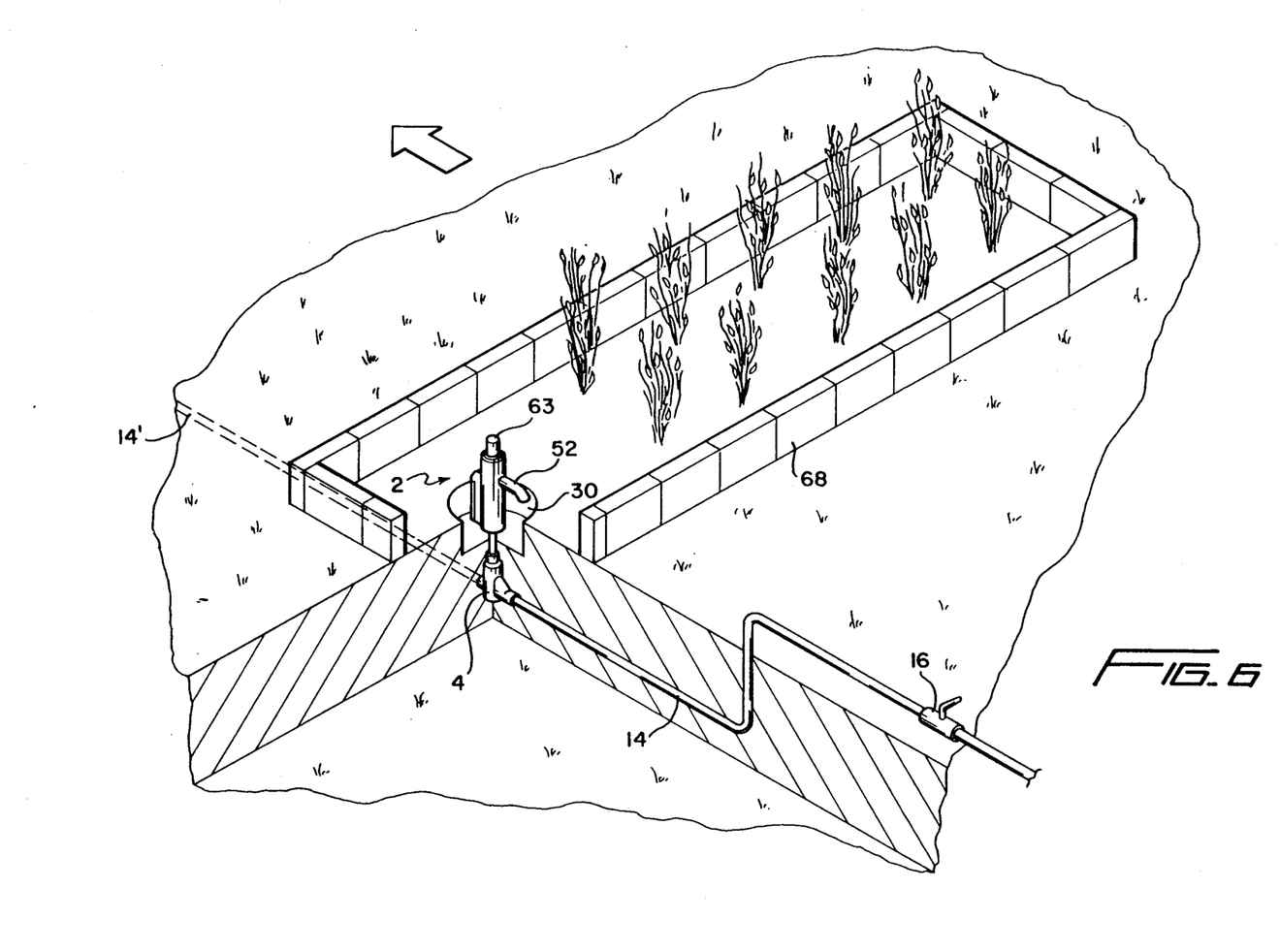
FIG. 6 is an isometric drawing which further illustrates the irrigation system shown in FIG. 3.

The inlet or opening 6 is connected to a source of pressurized water by means of a distribution pipe 14 and valve 16, as is more clearly illustrated in FIGS. 5 and 6.

The opening 8 in the upper portion on top of housing 4 may be fitted with a suitable coupling 18 which may be force fit in housing 4 and which is constructed and arranged to receive a riser 20 or upwardly extending pipe. The coupling 18 also includes a valve seat 22. A second valve seat 24 is formed in the second outlet 10 and is axially aligned along a horizontal axis with opening 6 and opposite therefrom.

A ball-shaped gate member 26 is disposed in the cylindrical housing 4 and has a diameter that is greater than the diameter of either of the outlets 8 and 10, but is less than the height of the enlarged inlet opening 13. The sizing of the ball-shaped gate member is important since it is freely fitted within housing 4 and mates with the valve seats 22 and 24 to close each of the outlets. However, the larger opening 6 on the inlet side allows water to flow past the ball-shaped gate member to the upwardly extending pipe or riser 20 when the ball-shaped gate member 26 is against the seat 24 with a minimal obstruction.

The ball-shaped gate member 26, housing 4 and coupling 18 are constructed and arranged so that when the gate member 26 is in its upper position against seat 22, the top of the enlarged opening 13 is below the middle of the gate member 26. Therefore, the flow of water and water pressure will hold the gate member 26 in its closed position.

The housing 4 and distribution pipe 14 are preferably buried in the ground as illustrated more clearly in FIGS. 5 and 6, and a pit 30 is formed immediately above housing 4. The pit 30 may, for example, define a right circular excavation or reservoir of sufficient depth to house a float 32 which actuates the closing of outlet 8 in a manner which will be described hereinafter.

The float 32 may be in the shape of a right circular cylinder with a central aperture or opening for attachment to a rod 57 which is next to and generally parallel to the upwardly extending pipe or riser 20 so that it will be moved upwardly therealong as the level of water in pit 30 rises in much the same manner as disclosed in my aforementioned application. However, in the preferred embodiment of the present invention, the float 32 is not concentric with riser 20 but moves up and down on an axis which is parallel with the axis of riser 20.

A rod 34 is connected to the top of gate member 26 and extends upwardly through the upwardly extending pipe or riser 20.

A coil spring 36 is disposed on an upper end of rod 34 and is positioned on rod 34 and a rubber grommet 37 is provided (see FIG. 2) to prevent water from flowing upwardly around rod 34. A displaceable biasing member 38 defines a central portion 39 having an aperture therein which passes over the rod 34 so that the spring biasing member 38 can move upwardly and downwardly on rod 34 with the spring 36 disposed between the nut 37 and the biasing member 38. A cap nut 37' is disposed above displaceable biasing member 38 so that rod 34 will be moved upwardly with an upward movement of the biasing member 38. The biasing member 38 also includes a pair of arms 38' which extend outwardly from the central portion 39. A tubular member 46 which defines a pair of vertical channels 46' is disposed above and axially aligned with the riser 20 and is constructed and arranged so that the ends of arms 38' extend through and slightly beyond the channels 46'.

A coupling 50 and spout 52 are disposed at the top of riser 20, between the riser 20 and tubular member 46 and supports a generally U-shaped pivotal member 47. The U-shaped pivotal member includes a central portion 48 and a pair of end portions 48' extending forward of the central portion 48 with end portion 48' parallel with one another. A stop means 49 positions the U-shaped member 47 within a generally horizontal plane when the U-shaped member 47 is in a first position.

The U-shaped member 47 also includes a pivotal mounting means 53 and a pair of upwardly extending elements 54 which define an upper cam surface 54' and stop means or shoulder 55. A yoke-like engaging means or connector 56 extends rearwardly from the central portion 39 of the U-shaped member 47. The connector 56 is adapted to receive a rod 57 within the yoke or open portion with a cap nut 58 at the top end of rod 57 and a second stop nut 59 shortly therebelow so that any upward movement of rod 57 will rotate the U-shaped member 47 about the pivot means 53. A float 32 is threadedly attached to a bottom portion of rod 57 and may be adjusted upwardly or downwardly thereon.

A cone-shaped member 61 is disposed in an upper portion of valve assembly 2 and may be formed as an integral part or top of tube 46. The cone-shaped member 61 defines a central aperture or opening which is adapted to receive a rod 62 which passes therethrough. The rod 62 extends upwardly and is fixed to a tubular cover 63 by means of a screw 63'. A spring 64 is coaxially aligned with and passes over and around rod 62 and is disposed between the top of tubular cover 63 and the cone-shaped member 61 so that the tubular cover 63 is biased upwardly by spring 64.

An actuating assembly 65 is disposed at the bottom of rod 62 and immediately below the cone-shaped member 61 and may include an additional spring 66 and actuator 67.

Figure 7:
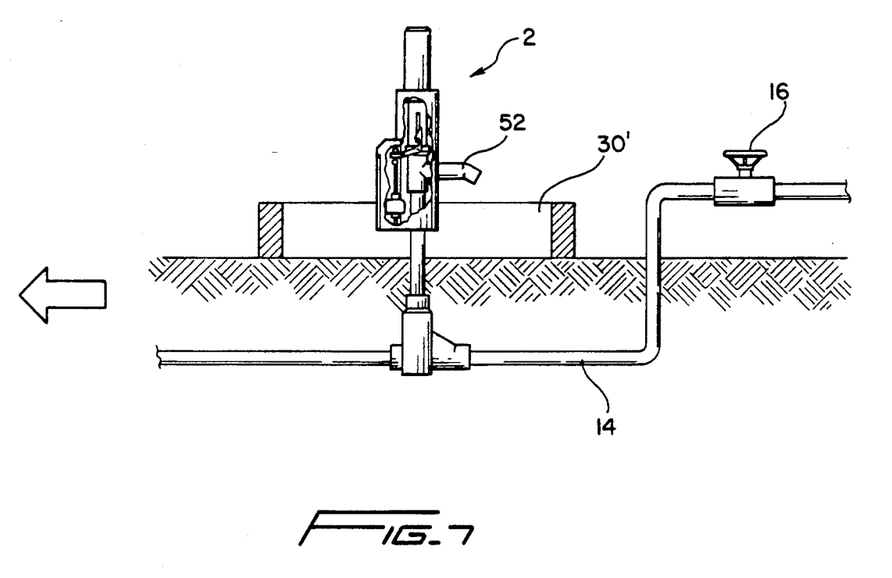
FIG. 7 is a schematic view showing an irrigation system according to a second embodiment of the invention.

An irrigation system in accordance with a preferred embodiment of the invention is illustrated in FIG. 7. As shown therein, the valve assembly 2 incorporates a relatively shallow basin or pit 30' wherein the basin 30' is disposed above ground, thus eliminating the need for the relatively deeper pits which have been used with various prior art devices. In the preferred embodiment of the present invention, the float 32 may be moved upwardly a few millimeters in order to trigger the spring-biased movement of the ball valve 26.

In the operation of a valve assembly 2, an individual manually prepares the system by pushing down on each of the tubular covers 63. This downward movement of cover 63 compresses spring 64 while pushing or moving rod 62 downwardly through the aperture in cone-shaped member 61. The downward movement of rod 61 moves the actuating assembly downward into engagement with the cap nut 37'. As the cap nut 37' engages washer 37", it forces the displaceable biasing means 38 downward so that the ends of arms 38' which extend beyond the channels 46' engage cam surface 54' to thereby rotate the U-shaped member 47 until the ends of arms 38' pass beyond shoulder 55. At this point, the weight of float 32 will return the pivotal U-shaped member 47 to a generally horizontal plane against stop 49 so that the shoulder 55 prevents the spring biasing member 38 from moving upwardly in channels 46' to thereby maintain spring 36 in a compressed or force stored condition.

The operation of an irrigation system in accordance with a preferred embodiment of the invention can be more readily explained with respect to FIG. 5. As illustrated therein, a valve 16 is connected to a pressurized source of water (not shown). Thus, when the valve 16 is opened, water under pressure flows into the inlet 6 of valve assembly 4 and forces a ball valve against a second outlet to close the outlet and force the water upward through the riser 20, and outwardly through the spout 52 and onto the ground in the area of the pit 30 and the basin 61. It is preferred that the area to be irrigated (basin 61) is surrounded by a suitable dike (border) 68 which separates the various basins. And then, when the water reaches a certain level in the basin 61 and hence in the pit 30 surrounding the irrigation system, the float 32 rises up and exerts pressure on the yoke-like connector 56 to rotate the U-shaped member 48 which releases the biasing member 38 which is then forced upwardly by the stored energy in spring 36. Since the force exerted by the spring 36 exceeds the force of the water against the gate member 26, the gate member 26 will spring upwardly into engagement with seat 22 to close the first outlet 8 and direct the water through outlet 10 and distribution pipe 14'.

Each of the successive valves 2, 2' etc. then operate in the same way until the entire area to be irrigated has been watered. An individual may then reset selected valve assemblies manually so that a number of plants can receive additional irrigation without requiring a complete recycle. For example, an individual can press cover 63 downwardly to reset a selected valve assembly.

The mechanisms of each valve assembly are preferably surrounded by a suitable housing 70 which may include a door 71 for adjusting the level of float 32 as will be readily understood by those skilled in the art.

The systems disclosed herein are presently thought to be more reliable than certain prior art systems since they incorporate a closed system, i.e., one which is protected against any irrigation water flowing back into the system. For example, the openings inside the hollow cylinder 4 and the ball-shaped gate member 26 are not exposed to the previously provided irrigation water from the basin 61. Thus, there is little or no chance for water to enter the system.

While the invention has been defined in connection with a preferred embodiment, it should be understood that changes and modifications may be made therein without departing from the scope of the claims.

What is claimed is:

1. An irrigation system for use with a pressurized source of water comprising a hollow valve housing which defines an upwardly extending hollow cylindrical portion having a first annular outlet in an upper portion thereof, said housing also defining an inlet in a lower portion thereof for connecting said housing to the pressurized source of water, said housing further defining a second annular outlet in the lower portion thereof, a ball-shaped gate member disposed within said housing and adapted to move upwardly and downwardly within said cylindrical portion, and seat means associated with each of said outlets for closing each of said outlets when said gate member is pressed thereagainst by water pressure, means for defining a pit, and float means disposed in said pit, an upwardly-extending pipe connected to said first outlet and extending above said pit, outlet means in an upper portion of said upwardly-extending pipe so that when said ball-shaped gate member is in a first position against said seat means associated with said second outlet to thereby close said second outlet, water from the pressurized source flows through said inlet, said housing, said first outlet and said upwardly extending pipe and out of said outlet means to fill said pit, a rod connected to said gate member and extended upwardly through said upwardly-extending pipe, and a spring having a first portion fixed to said rod and a displaceable biasing member engaging a second portion of said rod and said spring, positioning means for maintaining said biasing member and said spring in a force stored position and means for releasing said biasing member and said spring from said force stored position in response to the upward movement of said float as a result of an increase in the water level in said pit so that the force on said rod exceeds the force of the flow of water against said ball-shaped gate member whereupon the ball-shaped gate member springs out of said seat means which is associated with said second outlet and upwardly into engagement with said seat means which is associated with said first outlet to thereby close said first outlet and direct the flow of water through said second outlet.

2. An irrigation system according to claim 1 in which said displaceable biasing member defines a yoke-like structuring having a central aperture and a pair of arms extending outwardly therefrom and in which said spring is a coil spring which is disposed coaxially with said rod below said baising member and between said biasing member and an upper end of said rod and in which said positioning means compresses said spring to thereby store a force therein.

3. An irrigation system according to claim 2 in which said float includes adjusting means for adjusting the height at which said float will release said positioning means.

4. An irrigation system according to claim 2 in which said positioning means comprises a generally U-shaped pivotal member having a central portion and a pair of end portions extending forwardly of said central portion, said end portions being generally parallel at one end thereof and pivotal mounting means in said parallel end portions, said member also including engaging means extending rearwardly from said central portion and operatively connected to said float means so that an elevation of said float means will rotate said member about said pivotal mounting means, and a pair of elements extending from said end portions and angularly disposed with respect to said end portions, said elements including a shoulder for engaging one of said arms of said displaceable biasing member and a cam surface forward of said shoulder and means for engaging said cam surface for positioning said displaceable biasing means against said shoulder.

5. An irrigation system according to claim 4 which includes stop means disposed below and associated with said generally U-shaped pivotal member for positioning said U-shaped member in a generally horizontal plane and in which said pair of elements extend upwardly along a vertical axis when said U-shaped member is in a generally horizontal position.

6. An irrigation system according to claim 5 in which said means for engaging said cam surface includes a spring for biasing said means away from said surface.

7. An irrigation system according to claim 6 which includes spring biased actuating means for forcing said displaceable biasing member into a force stored position.

* * * * *